United States Patent
Biskeborn et al.

(10) Patent No.: US 8,191,234 B2
(45) Date of Patent: Jun. 5, 2012

(54) METHOD OF MANUFACTURING A MAGNETIC HEAD WITH REINFORCING ISLANDS

(75) Inventors: Robert G. Biskeborn, Hollister, CA (US); Calvin S. Lo, Saratoga, CA (US); Cherngye Hwang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 671 days.

(21) Appl. No.: 12/184,357

(22) Filed: Aug. 1, 2008

(65) Prior Publication Data

US 2010/0027163 A1 Feb. 4, 2010

(51) Int. Cl.
*G11B 5/23* (2006.01)
*B44C 1/22* (2006.01)

(52) U.S. Cl. ............... 29/603.11; 29/603.12; 29/603.16; 216/39; 216/66; 204/192.34; 360/121; 360/122

(58) Field of Classification Search ............... 29/603.11, 29/603.12, 603.16, 603.18; 204/192.34; 216/52, 63, 66; 360/121, 122; 219/39
See application file for complete search history.

(56) References Cited

U.S. PATENT DOCUMENTS

| | | | |
|---|---|---|---|
| 4,729,161 A | | 3/1988 | Verbunt et al. |
| 4,774,616 A | * | 9/1988 | Kumasaka et al. |
| 5,777,829 A | | 7/1998 | Voldman et al. |
| 6,324,031 B1 | | 11/2001 | Comstock et al. |
| 6,445,538 B1 | | 9/2002 | McKinstry et al. |
| 7,031,109 B1 | | 4/2006 | Granstrom et al. |
| 7,256,963 B2 | | 8/2007 | Saliba |
| 2005/0207069 A1 | | 9/2005 | Suda |
| 2008/0037170 A1 | | 2/2008 | Saliba |

FOREIGN PATENT DOCUMENTS

JP 62054813 A * 3/1987

* cited by examiner

*Primary Examiner* — A. Dexter Tugbang
(74) *Attorney, Agent, or Firm* — Suiter Swantz pc llo

(57) ABSTRACT

A method for protecting a thin film structure including fabricating a plurality of island structures in a recording gap of a magnetic recording head, exposing a substantial portion of the plurality of island structures by removing at least a portion of the surrounding recording gap material via at least one etching process, including ion milling, coating the magnetic recording head containing the plurality of island structures with a coating material, including silicon nitride or aluminum oxide, and removing at least a portion of the coating material via a removal process, including chemical-mechanical polishing or lapping, to expose an uppermost region of at least a portion of said plurality of island structures.

1 Claim, 5 Drawing Sheets

METHOD OF MANUFACTURING A MAGNETIC HEAD WITH REINFORCING ISLANDS

TECHNICAL FIELD

The present disclosure generally relates to the field of magnetic recording devices, and more particularly to a method for protecting a thin film structure in a recording gap of a magnetic recording head using fabricated island structures.

BACKGROUND

Magnetic storage is one of the most widely used technologies in the storage of electronic, audio, and video data. Examples of systems based on magnetic storage are the hard disk drive and the tape drive. In both systems, data is written to a magnetic medium using a write head, and may be accessed using a magnetic read head.

SUMMARY

The present disclosure is directed to a method for protecting a thin film structure including, but not limited to, fabricating a plurality of island structures in a recording gap of a magnetic recording head; exposing a substantial portion of the plurality of island structures by removing at least a portion of the surrounding recording gap material via at least one etching process, including ion milling; coating the magnetic recording head containing the plurality of island structures with a coating material, including silicon nitride or aluminum oxide; and removing at least a portion of the coating material via a removal process, including chemical-mechanical polishing or lapping, to expose an uppermost region of at least a portion of the plurality of island structures.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
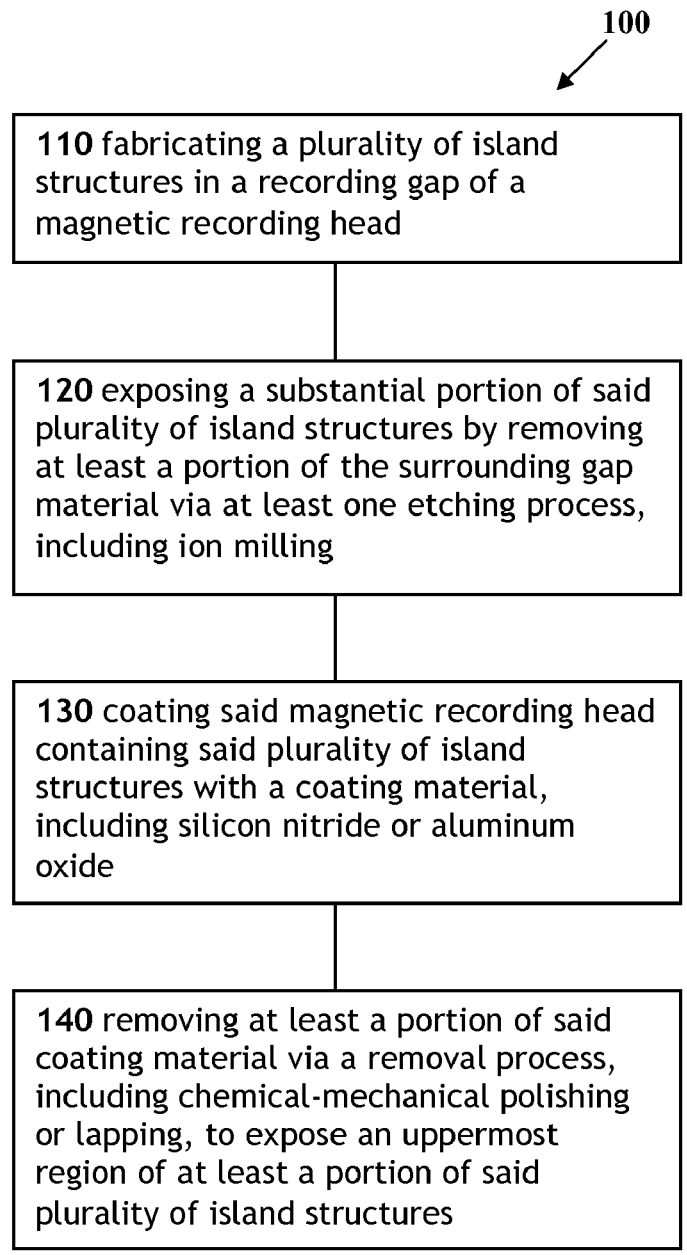
FIG. 1 is a flow diagram of a method for protecting a thin film structure in a magnetic recording head.

Referring to FIG. 1, a method 100 for protecting a thin film structure in a magnetic recording head is described. At step 110, the method 100 fabricates a plurality of island structures in the recording gap of the magnetic recording head. At step 120, the method 100 exposes a substantial portion of said plurality of island structures by removing at least a portion of the surrounding recording gap material. At step 130, the method 100 coats the magnetic recording head with a coating material via at least one etching process, including ion milling. At step 140, the method 100 removes at least a portion of coating material thereby exposing the uppermost region of a substantial portion of the island structures.

Figure 2:
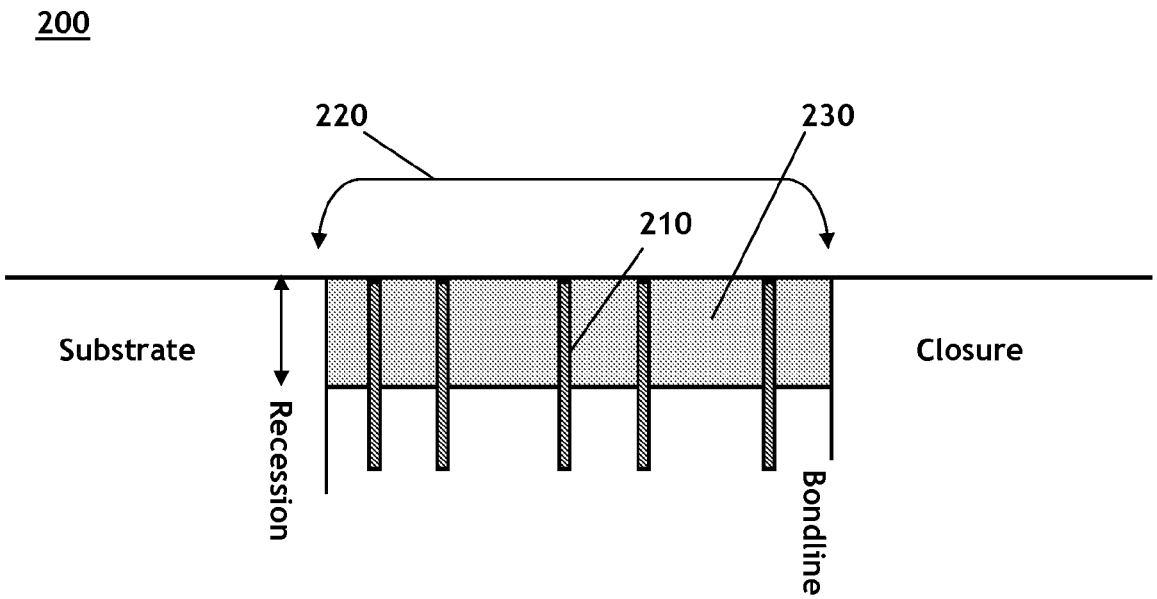
FIG. 2 is a diagram illustrating a plurality of island structures fabricated in the recording gap of a magnetic recording head.

Referring to FIG. 2, a diagram 200 illustrating a plurality of island structures 210 fabricated in the recording gap 220 of a magnetic recording head in accordance with an exemplary embodiment of the present invention is shown. For example, the plurality of island structures may be fabricated in a recording gap 220 of a magnetic recording head during wafer thin film processing. The material used to fabricate the island structures 210 may include a conductive material, a metal, an insulating material, any suitable material, or any combination of suitable materials. For example, the island structures 210 may be fabricated using refractory metals (e.g., tantalum or tungsten), laminated films, or composite films (e.g., a metal film co-fabricated with diamond particles).

Figure 3:
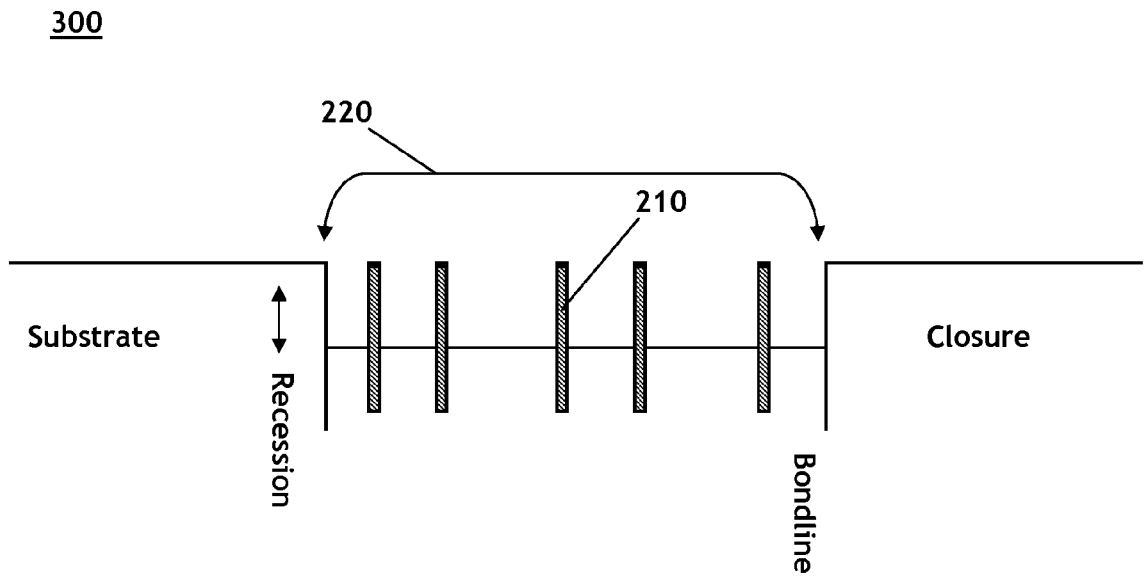
FIG. 3 is a diagram illustrating a substantial portion of a plurality of island structures exposed by removing at least a portion of the surrounding recording gap material using at least one etching process.

Referring to FIG. 3, a diagram 300 illustrating a substantial portion of a plurality of island structures 210 exposed by removing the surrounding recording gap material 230 using at least one etching process in accordance with an exemplary embodiment of the present invention is shown. For example, a substantial portion of said plurality of island structures 210 may be exposed using ion milling, reactive ion etching, sputtering, or wet etching processes.

Figure 4:
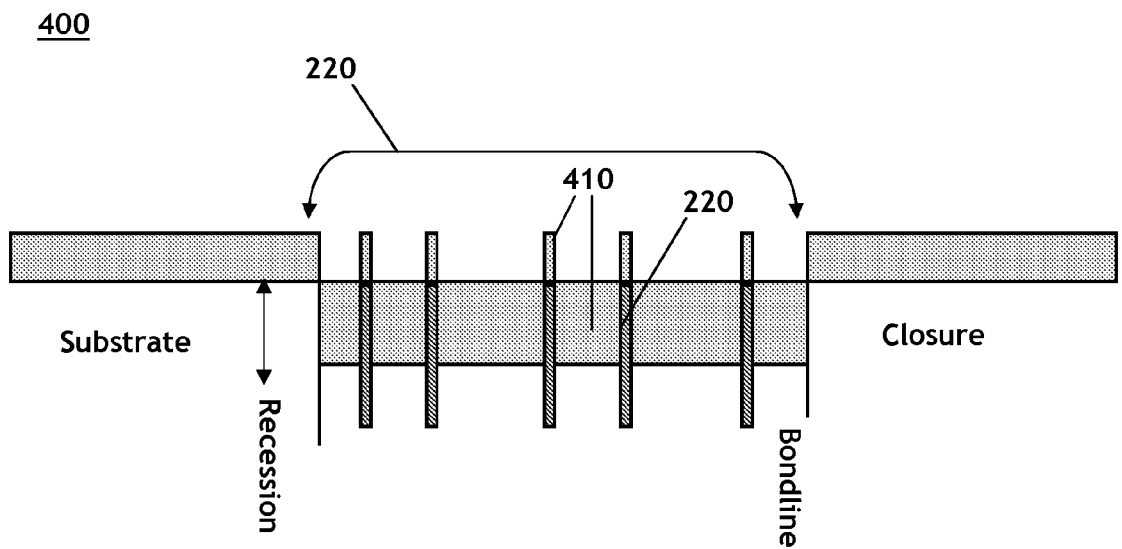
FIG. 4 is a diagram illustrating the recording gap in a magnetic recording head including a plurality of island structures coated by a coating material.

Referring to FIG. 4, a diagram 400 illustrating a recording gap 220 in a magnetic recording head including a plurality of island structures 210 coated by a coating material 410 in accordance with an exemplary embodiment of the present invention is shown. For example, the coating material 410 used to coat the head containing the recording gap 220 containing a plurality of island structures 210 may include silicon nitride, aluminum oxide, or other materials with strong adhesion to the recording gap material.

Figure 5:
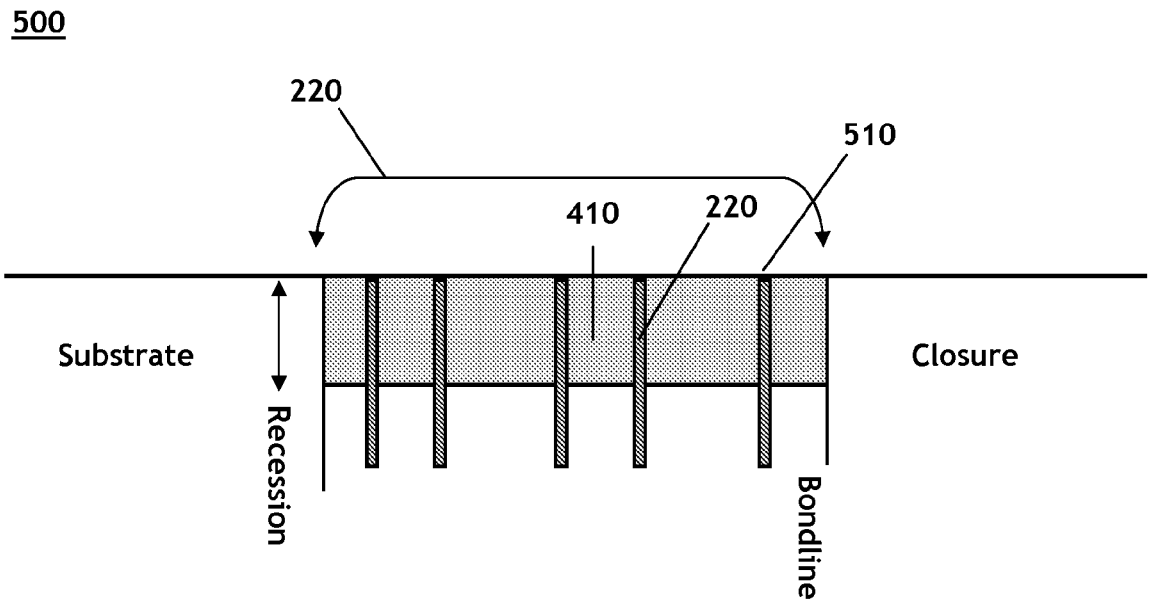
FIG. 5 is a diagram illustrating the uppermost region of at least a portion of the plurality of island structures exposed by removing at least a portion of coating material using a removal process.

Referring to FIG. 5, a diagram 500 illustrating the uppermost region 510 of at least a portion of the plurality of island structures exposed by removing at least a portion of coating material 410 using a removal process in accordance with an exemplary embodiment of the present invention is shown. For example, the uppermost region 510 of at least a portion of the plurality of island structures may be exposed by removing at least a portion of coating material 410 using chemical-mechanical polishing or lapping.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method for protecting a thin film structure, comprising:

fabricating a plurality of island structures in a recording gap of a magnetic recording head;

exposing a substantial portion of said plurality of island structures by removing at least a portion of surrounding recording gap material via at least one etching process, including ion milling;

coating said magnetic recording head containing said plurality of island structures with a coating material, including silicon nitride or aluminum oxide; and removing at least a portion of said coating material via a removal process, including chemical-mechanical polishing or lapping, to expose an uppermost region of at least a portion of said plurality of island structures.

* * * * *